United States Patent [19]

Mauduech

[11] 3,735,264

[45] May 22, 1973

[54] COMPANDING PULSE CODE MODULATION SYSTEM

[76] Inventor: Robert R. Mauduech, 7, rue du Docteur Roux, Perros-Guirec, France

[22] Filed: Sept. 8, 1969

[21] Appl. No.: 855,881

[30] Foreign Application Priority Data

Sept. 11, 1968 France..............................68165786

[52] U.S. Cl. ....................325/38, 328/142, 329/109, 333/14

[51] Int. Cl...............................................H03k 13/00

[58] Field of Search ....................325/38, 325; 332/9, 332/1; 328/142, 144, 145; 333/14; 329/109; 235/177

[56] References Cited

UNITED STATES PATENTS

| | | | |
|---|---|---|---|
| 3,452,297 | 6/1969 | Kelly et al. | 332/9 |
| 3,473,132 | 10/1969 | Keeler et al. | 332/1 |

*Primary Examiner*—Donald J. Yusko
*Attorney*—Abraham A. Saffitz

[57] ABSTRACT

A plurality of cascaded attenuators, comparators, and switching means develops from an analogue signal a set of successive "one" digits and an adjacent set of successive "zero" digits. These digits correlate with the P.M.C. code as determined by a computer.

1 Claim, 6 Drawing Figures

Patented May 22, 1973 3,735,264

5 Sheets-Sheet 1

INVENTOR:

Robert R. MAUDUECH

By: Abraham A. Saffitz

ATTORNEY

INVENTOR:
Robert R. MAUDUECH
By: Abraham A. Saffitz
ATTORNEY

Patented May 22, 1973 3,735,264

5 Sheets-Sheet 3

INVENTOR:
Robert R. MAUDUECH
By: Abraham A. Saffitz
ATTORNEY

INVENTOR
Robert R. MAUDUECH
By: Abraham A. Saffitz
ATTORNEY

INVENTOR:
Robert R. MAUDUECH
By: Abraham A. Saffitz
ATTORNEY

COMPANDING PULSE CODE MODULATION SYSTEM

The present invention relates to nonlinear pulse code modulation systems and coders employing amplitude compression and to decoders employing amplitude expansion. More particularly this invention relates to coders and decoders utilizing discrete cascaded attenuators each having two values of attenuation.

Pulse code modulation or PCM communication systems employ an encoder at the transmitting terminal to convert the magnitude and polarity of a sample of an intelligence signal, such as an audio signal, to a group of pulses in accordance with a predetermined code. These pulse groups are the transmitted signal and must be translated at the receiver into a representation of the original signal. A decoder is provided at the receiver to reconstruct the signal sample. The sample may then be recombined with adjacent samples to recover the original signal.

It is well known that the coding of weak analog signals should be produced with high precision; on the contrary, a definite tolerance is acceptable for the coding of substantial analog signals. Accordingly, it is advantageous to employ PCM systems giving unequal weights to the quantizing steps of the so-called compression and expansion type.

The compression law commonly recognized as the most favorable to quantify the analog signals to be coded is that which, expressed in relative variables, is represented by the expression symmetrical with respect to zero:

$$y = \log_e (1 + \mu x) / \log_e (1 + \mu) \qquad (1)$$

in which:

$$y = p/n \qquad x = V_p/V_{max}.$$

$p$ denoting the order of the quantification step, counted in the direction of increasing amplitudes;
$n$ the total number of quantification steps;
$V_p$ the instantaneous value of the signal amplitude to be coded, applied to the input point of the encoder, for the step of the order $p$;
$V_{max}$ the maximum value of the signal amplitude;
$\mu$ a dimensionless parameter whose optimum value is 100.

According to the compression principle of the invention, nine points 0 *a b c d e f g h* are taken on the curve defined by equation (1), these points being the limits of eight quantizing steps and between these points the curve is replaced by straight lines. The coordinates of these nine points are the following:

$$x = 0 \quad \frac{1}{128} \quad \frac{1}{64} \quad \frac{1}{32} \quad \frac{1}{16} \quad \frac{1}{8} \quad \frac{1}{4} \quad \frac{1}{2} \quad 1$$

$$y = 0 \quad \frac{1}{8} \quad \frac{1}{4} \quad \frac{3}{8} \quad \frac{1}{2} \quad \frac{5}{8} \quad \frac{3}{4} \quad \frac{7}{8} \quad 1$$

or $$\begin{cases} v_p = 0 \quad 8 \quad 16 \quad 32 \quad 64 \quad 128 \quad 256 \quad 512 \quad 1024 \\ p = 0 \quad 8 \quad 16 \quad 24 \quad 32 \quad 40 \quad 48 \quad 56 \quad 64 \end{cases} \qquad (2)$$

if it is assumed that $V_{max} = 1024$ and $n = 64$. It is to be noticed that all the coordinate values of the equations (2) are multiples of 8.

Each of the straight lines joining two adjacent points on curve (1) is divided into eight equal segments by seven points the coordinates of which form an arithmetical progression whose ratio is the eighth part of the coordinate difference between said two adjacent points.

The following table I gives the abscissae and ordinates of the 64 points (65 if terminal point *h* is included), 8 on the curve and 56 on the broken line approximating the curve.

| Ordinate $p$ of the steps | Abscissa $V_p$ of the steps | | | | | | | |
|---|---|---|---|---|---|---|---|---|
| $T_1, T_2, T_3$ \ X, Y, Z | 0= 000 | 1= 001 | 2= 010 | 3= 011 | 4= 100 | 5= 101 | 6= 110 | 7= 111 |
| 0=000 | 0 | 1 | 2 | 3 | 4 | 5 | 6 | 7 |
| 1=001 | 8 | 9 | 10 | 11 | 12 | 13 | 14 | 15 |
| 2=010 | 16 | 18 | 20 | 22 | 24 | 26 | 28 | 30 |
| 3=011 | 32 | 36 | 40 | 44 | 48 | 52 | 56 | 60 |
| 4=100 | 64 | 72 | 80 | 88 | 96 | 104 | 112 | 120 |
| 5=101 | 128 | 144 | 160 | 176 | 192 | 208 | 224 | 240 |
| 6=110 | 256 | 288 | 320 | 352 | 384 | 416 | 448 | 480 |
| 7=111 | 512 | 576 | 640 | 704 | 768 | 832 | 896 | 960 |

The value of p for each of the quantizing steps can be expressed in an octal binary system including two octal digits each formed of three bits:

$$p = (T_1\ T_2\ T_3)8^1 + (X\ Y\ Z)8^0$$

The first octal digit represents the ordinate of a given point on the curve and the second octal digit the serial number of a given point on the straight line starting from said given point on the curve. For example the quantizing step defined by points *i* and *j* has for its ordinate $$(1\ 1\ 1)8^1 + (0\ 1\ 0)8^0 = 58$$

The arithmetical ratio of the abscissa values of Table I is not the same throughout the table; it is 1 in lines 0 and 1, 2 in line 2, 4 in line 3, 8 in line 4, 16 in line 5, 32 in line 6 and 64 in line 7.

The arithmetical ratio doubles from a line to the following, respectively from line 2 to line seven but it does not double between lines 0 and 1.

The relationship between the abscissa $V_p$ and the ordinate $p = (T_1\ T_2\ T_3\ X\ Y\ Z)$, the sign bit being disregarded, is:

$$V_p = (1\ X\ Y\ Z)\ 2^{(T_1T_2T_3 - 1)} \qquad (3)$$

except for the $V_p$ values of line 0. For example, let us search after the value of $V_p$ for $p = (011)(110) = 30$ $$V_p = 1\ 1\ 1\ 0\ \ 2^{(011\ -\ 1)} = 56$$

which complies with table I.

For line 1 of table I equation (3) becomes:

$$V_p = X\ Y\ Z \qquad (3')$$

The analog values of $V_p$ are converted into binary code according a special codification. The coded values comprise ten bits (the sign bit disregarded):

$$V_p = A\ B\ C\ D\ E\ F\ G\ X\ Y\ Z \qquad (4)$$

As already said, the ordinate of a quantizing step is expressed in binary code by two groups of three bits ($T_1$ $T_2$ $T_3$) and ($X$ $Y$ $Z$). The group ($T_1$ $T_2$ $T_3$) defines groups of steps and the group ($X$ $Y$ $Z$) the step in the group. The step groups have different heights while the steps of a given group have the same height.

In the code of $V_p$ the three last bits ($X$ $Y$ $Z$) are the same as in the code of the step number p. The other digits $A$ $B$ $C$ $D$ $E$ $F$ $G$ are bits but do not form a binary number in the usual meaning. They form numbers having one digits at the left hand side and zero digits at the right hand side, the ones and the zeroes never being interlaced and the number of ones being equal to the decimal number equal to ($T_1$ $T_2$ $T_3$). The codes of $V_p$ are tabulated in the following table II.

TABLE II

| Ordinate $p$ of the group of step $T_1$ | $T_2$ | $T_3$ | Abscissa range of the group of steps | Code of $V_p$ A | B | C | D | E | F | G | X Y Z |
|---|---|---|---|---|---|---|---|---|---|---|---|
| 0 | 0 | 0 | 0–(8–ε) | 0 | 0 | 0 | 0 | 0 | 0 | 0 | variable according to the serial number of the step in the group |
| 0 | 0 | 1 | (8–ε)–(16–ε) | 1 | 0 | 0 | 0 | 0 | 0 | 0 | |
| 0 | 1 | 0 | (16–ε)–(32–ε) | 1 | 1 | 0 | 0 | 0 | 0 | 0 | |
| 0 | 1 | 1 | (32–ε)–(64–ε) | 1 | 1 | 1 | 0 | 0 | 0 | 0 | |
| 1 | 0 | 0 | (64–ε)–(128–ε) | 1 | 1 | 1 | 1 | 0 | 0 | 0 | |
| 1 | 0 | 1 | (128–ε)–(256–ε) | 1 | 1 | 1 | 1 | 1 | 0 | 0 | |
| 1 | 1 | 0 | (256–ε)–(512–ε) | 1 | 1 | 1 | 1 | 1 | 1 | 0 | |
| 1 | 1 | 1 | (512–ε)–(1024–ε) | 1 | 1 | 1 | 1 | 1 | 1 | 1 | |

The relationship between the bits $T_1$, $T_2$, $T_3$ and the bits $A$, $B$, $C$, $D$, $E$, $F$, $G$ are the following:

$$\left.\begin{aligned} T_1 &= D \\ T_2 &= B\,\overline{D} + F \\ T_3 &= A\,\overline{B} + C\,\overline{D} + E\,\overline{F} + G \end{aligned}\right\} \quad (5)$$

$$\left.\begin{aligned} A &= T_1 + T_2 + T_3 \\ B &= T_1 + T_2 \\ C &= T_1 + T_2\,T_3 \\ D &= T_1 \\ E &= T_1\,T_3 + T_1\,T_2 \\ F &= T_1\,T_2 \\ G &= T_1\,T_2\,T_3 \end{aligned}\right\} \quad (6)$$

For example, let us assume that $V_p = 96$ $$V_p = 1\ 1\ 1\ 1\ 0\ 0\ 0\ 1\ 0\ 0$$

thus $$A = B = C = D = X = 1$$

$$E = F = G = Y = Z = 0$$

Equations (5) give:

$$T_1 = 1$$

$$T_2 = 0$$

$$T_3 = 0$$

$$(T_1\ T_2\ T_3) = (1\ 0\ 0) = 4$$

which complies with table I.

The encoder of the invention compares the sample to be coded into PCM bits and the same sample divided by the successive powers of two to predetermined voltages in a set of cascaded comparators which generates the bits $A$ – $G$; it codes the residue of said sample after the comparisons in a linear coder which generates the bits ($X$ $Y$ $Z$) and converts the special code ($A$ $B$ $C$ $D$ $E$ $F$ $G$) into a binary code ($T_1$ $T_2$ $T_3$). The PCM code of the sample is then ($T_1$ $T_2$ $T_3$ $X$ $Y$ $Z$). The compression proper is implemented during the conversion from ($A$ $B$ $C$ $D$ $E$ $F$ $G$) to ($T_1$ $T_2$ $T_3$).

Companding encoders and decoders using switchable and cascaded attenuators forming an attenuation network, each being designed for attenuating, if switched, an input signal to a level which is a function of its rank in the network are known in the prior art. In said companding systems the attenuation network is a non-linear network and it may be said that in this system compression and expansion is performed analogically. In the invention on the contrary the compression is performed digitally and results from digital relationships between the bits of a sample coded in a special code and the bits of the corresponding compressed sample expressed in a binary code.

The invention will be grasped more readily upon reading the following detailed description given with reference to the accompanying drawings, in which.

Figure 1:
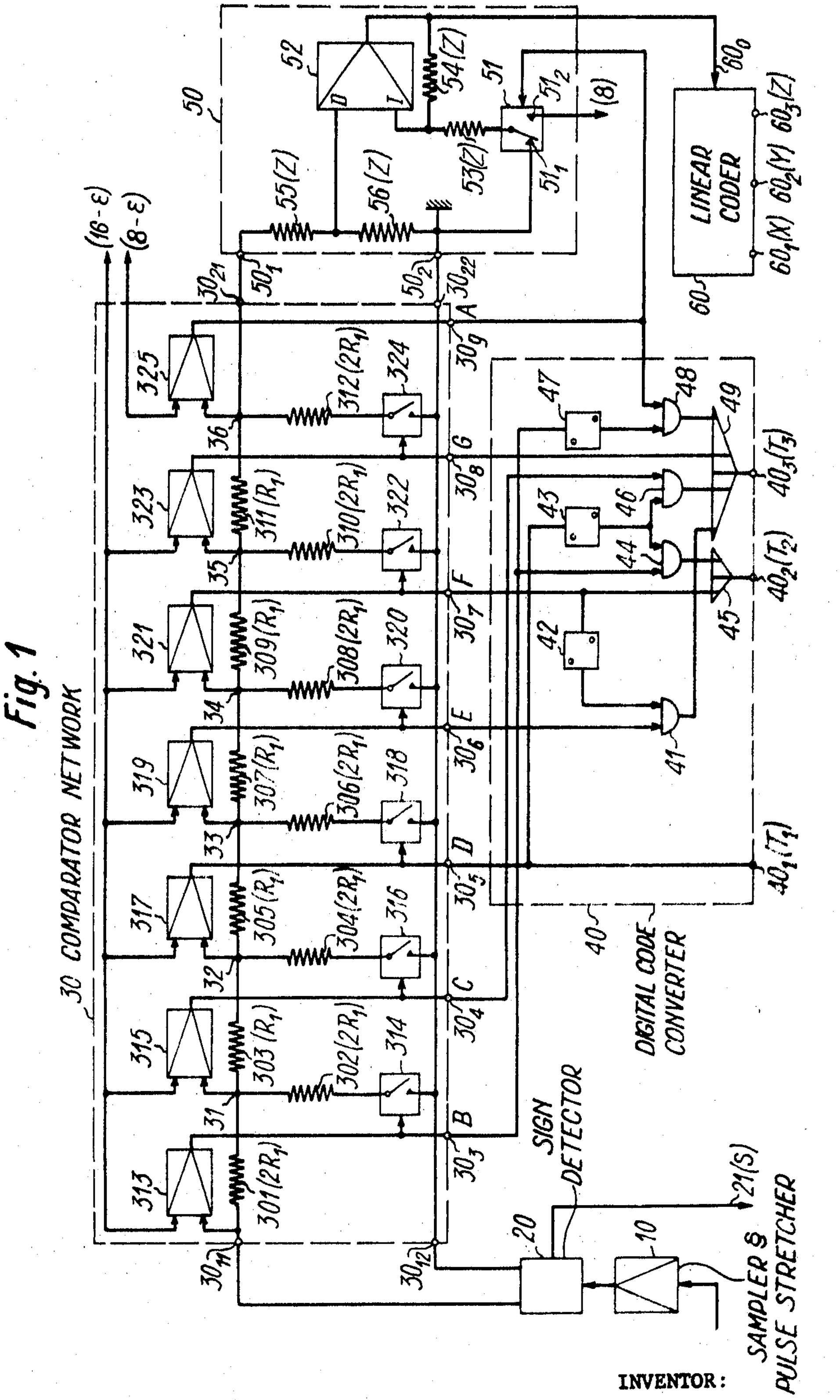
FIG. 1 illustrates a compression coder according to the invention.

In this figure the reference numeral 10 designates an amplitude sampler and pulse stretcher receiving the analog signals to be coded; it may be of any known type; at its output point, it delivers constant amplitude pulses whose duration is at least equal to the duration of the coding operation. Circuit 10 is connected to polarity detector 20 which is simultaneously a rectifier and the sign stage of the encoder. It gives at one of its outputs the analog signal to be coded with always a positive polarity and at its second output 21 a bit S which is zero or unity depending on whether the polarity of the incoming signal is negative or positive. This detector may be of known type; a preferred form of embodiment will be described in the following, however.

Circuit 30 is the comparator network comprising seven stages interconnected by switchable dividers-by-two. Circuit 30 generates the bits *A, B, C, D, E, F, G*. Circuit 40 is a logical circuit which derives $T_1$, $T_2$, $T_3$ from *A* – *G* and 50 is a subtracter arranged at the output point of the comparator network 30 so that the linear coder 60 receives the appropriate voltages at its input.

The comparator network 30 comprises six series arms of which the first 301, connected to the input terminal $30_{11}$, has a resistance (2 $R_1$) whereas the other five 303, 305, 307, 309, 311 have resistances of the value ($R_1$) and six shunt arms 302, 304, 306, 308, 310, 312 having the same resistance 2 $R_1$.

These shunt arms equally comprise switches 314, 316, 318, 320, 322, 324, which may, for example, consist of transistors operating by passing from the blocked condition to the saturated condition. These switches, open in the idle state, are closed thanks to the voltages which appear at the output terminals of the comparators 313, 315, 317, 319, 321, 323, 325 allocated respectively to the switches 314, 316, 318, 320, 322, 324.

These comparators, which are all identical, are differential amplifiers of known type, possessing a high input impedance. The first input terminals of comparators 313, 315, 317, 319, 321, 323, are all connected to a source of constant voltage having a value slightly smaller than 16 quantizing steps. Only the first input terminal of comparator 325 is connected to a source of constant voltage having a value slightly smaller than 8 quantizing steps. The second input terminal of comparator 313 is connected to the input terminal $30_{11}$ of the comparator network. The second input terminals of comparators 315, 317, 319, 321, 323, 325, are connected respectively to the points 31 – 36 common to the adjacent series resistances of the network.

E denoting the sample applied at the input terminals $30_{11}$ – $30_{12}$ of the line, this will be compared to the voltage $(16-\epsilon)$ in the comparator 313 ($\epsilon$ is a very small quantity).

If $E<(16-\epsilon)$, no signal issues from the comparator, the switches 314, 316, 318, 320, 322, 324 remain open, and no coded signal appears at the terminals $30_3$, $30_4$, $30_5$, $30_6$, $30_7$, $30_8$.

As for the comparator 325, a distinction may be drawn between two cases:

1. If $0<E<(8-\epsilon)$, the voltage at the point 36 is equal to E since none of the shunt arms of the network is in operation and moreover, the impedance connected to the output terminals $30_{21}$, $30_{22}$ is very great compared to 7 $R_1$ the sum of the resistances 301, 303, 305, 307, 309, 311.

The comparator 325 compares the voltage *E* to the voltage $(8-\epsilon)$ and, as a result, a zero pulse issues from the said comparator at $30_9$.

2. If $(8-\epsilon)<E<(16-\epsilon)$, the voltage present at the point 36 is higher than $(8-\epsilon)$ and a one pulse appears at the output terminal $30_9$ of the comparator 325.

The first two lines of table II are thus justified.

The case of the third line of table II will now be considered, that is:

$$(16-\epsilon)<E<(32-\epsilon)$$

The comparator 313 transmits a signal $B=1$ which appears at the terminal $30_3$. Moreover, this signal causes the closing of the switch 314, which places shunt arm 302 in operation.

Owing to the fact that the output impedance of the polarity detector 20 is very low, the voltage which appears at 31, at the terminals of the resistance 302, is equal to $E / 2$, and since $$(8-\epsilon)<E/2<(16-\epsilon)$$

the comparator 315 does not transmit a signal, so that $C=0$ at the terminal $30_4$.

The comparator 325 is driven at 36 by the voltage $E / 2$ and according to the preceding, the signal $A = 1$ appears at the terminal 30. The third line of table II is thus justified.

If $$(32-\epsilon)<E<(64-\epsilon)$$

the comparators 313, 315 come into action, the switches 314 and 316 close, and $B=1$, $C=1$. A voltage $E / 4$ appears at the point 32, owing to the fact that according to the theorem of Thevenin, the impedance of the source having 31 as its terminal, is equal to 2 $R_1$ (resistance 303 + resistances 301 and 302 in parallel).

The comparator 325 is thus driven at 36 by voltages comprised within the range:

$$(8-\epsilon)<E/4<(16-\epsilon)$$

and consequently transmits a signal $A = 1$. The fourth line of table II is thus justified. The same reasoning is applicable to the following lines of the same table II.

Logical circuit 40 establishes the Boolean functions (5).

As apparent from FIG. 1, digit $T_1$ which is identical to digit D is obtained at terminal $40_1$. The function $B\overline{D}$ is generated by AND gate 44 and inverter 43. The OR gate 45 receiving $B\overline{D}$ and $F$ at its input terminals generates digit $T_2$ which appears at terminal $40_2$. The function $A\overline{B}$ is established by the AND gate 48 and the inverter 47. $C\overline{D}$ is formed by the AND gate 46 and the inverter 43; $E\overline{F}$ is formed by the AND gate 41 and the inverter 42. The OR gate 49 receiving $A\overline{B}$, $C\overline{D}$, $E\overline{F}$ and $G$, provides the binary element $T_3$ at its output terminal $40_3$.

At the output terminals $30_{21}$, $30_{22}$ of the comparator network 30 voltages comprised within the range $0-(8-\epsilon)$ appear for the signals of the line 0 of the table II and voltages comprised within the range $(8-\epsilon)-(16-\epsilon)$ for the signals of all the other lines 1 – 7 of the table. So that it may transmit the three right-hand bits *X, Y, Z* at its output terminals $60_1$, $60_2$, $60_3$, the linear coder 60 should receive, at its input terminal $60_0$, voltages comprised within the range $0-(8-\epsilon)$ irrespective of the amplitude range which includes the sample to be coded. The known device 50 interposed between the comparator network 30 and the coder 60, renders it possible to obtain this result.

Device 50 essentially comprises an operational amplifier 50 and a switch 51 controlled by the output of comparator 325. If $V_{51}$ is the voltage supplied by the switch 51 and if $V_{60}$ is the voltage at the input terminal of the coder 60, the voltage at the terminal I of the amplifier 52, is:

$$V_I = ½\,(V_{60}+V_{51})$$

If $V_{50}$ is the voltage at the output terminal $30_{21}$ of the network 30, the voltage at the terminal D of the amplifier 52, is:

$$V_D = ½\ V_{50}$$

Since, very approximately, $_D = V_I$ :

$$V_{60} + V_{51} = V_{50}$$

or $$V_{60} = (V_{50} - V_{51})$$

if $$V_{51} = 0$$

$$V_{60} = V_{50}$$

if $$V_{51} = 8$$

$$V_{60} = V_{51} - 8$$

Figure 2:
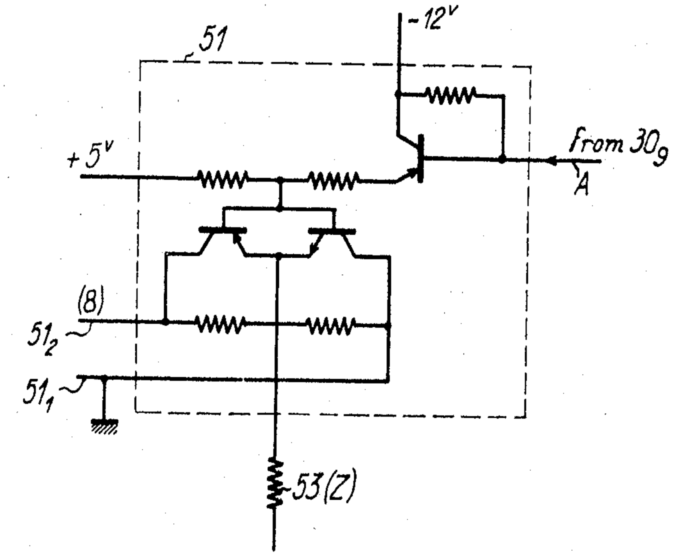
FIGS. 2 and 3 show diagrams of elements employed in the coder of FIG. 1.

By way of example, FIG. 2 shows an embodiment of the switch 51. It is of known type and lacks any special feature.

Figure 3:
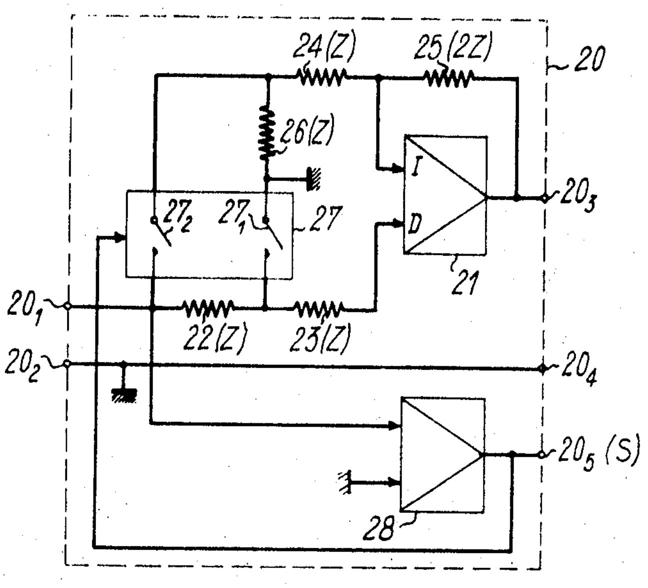

By way of example, FIG. 3 shows an embodiment of the polarity or sign detector 20. Irrespective of the polarity of the sample to be coded which is applied to the input terminals $20_1$, $20_2$, a corresponding sample of the same amplitude and of always positive polarity appears at the output terminals $20_3$, $20_4$ of amplifier 21. At its output terminal $20_5$ moreover, the comparator 28 provides the sign bit S which is zero when the sample to be coded is of negative polarity, and one if it is of positive polarity. This bit S = 1 equally controls the set of switches 27 which, when they are closed, connect the direct input of amplifier 21 to ground through resistance 23; the sample to be coded appears at the terminals of resistance 26, that is to say at the inverting input of amplifier 21 which has a gain of −2. When the switches 27 are open, the voltage appears at *D* and the gain then amounts to +2.

Figure 4:
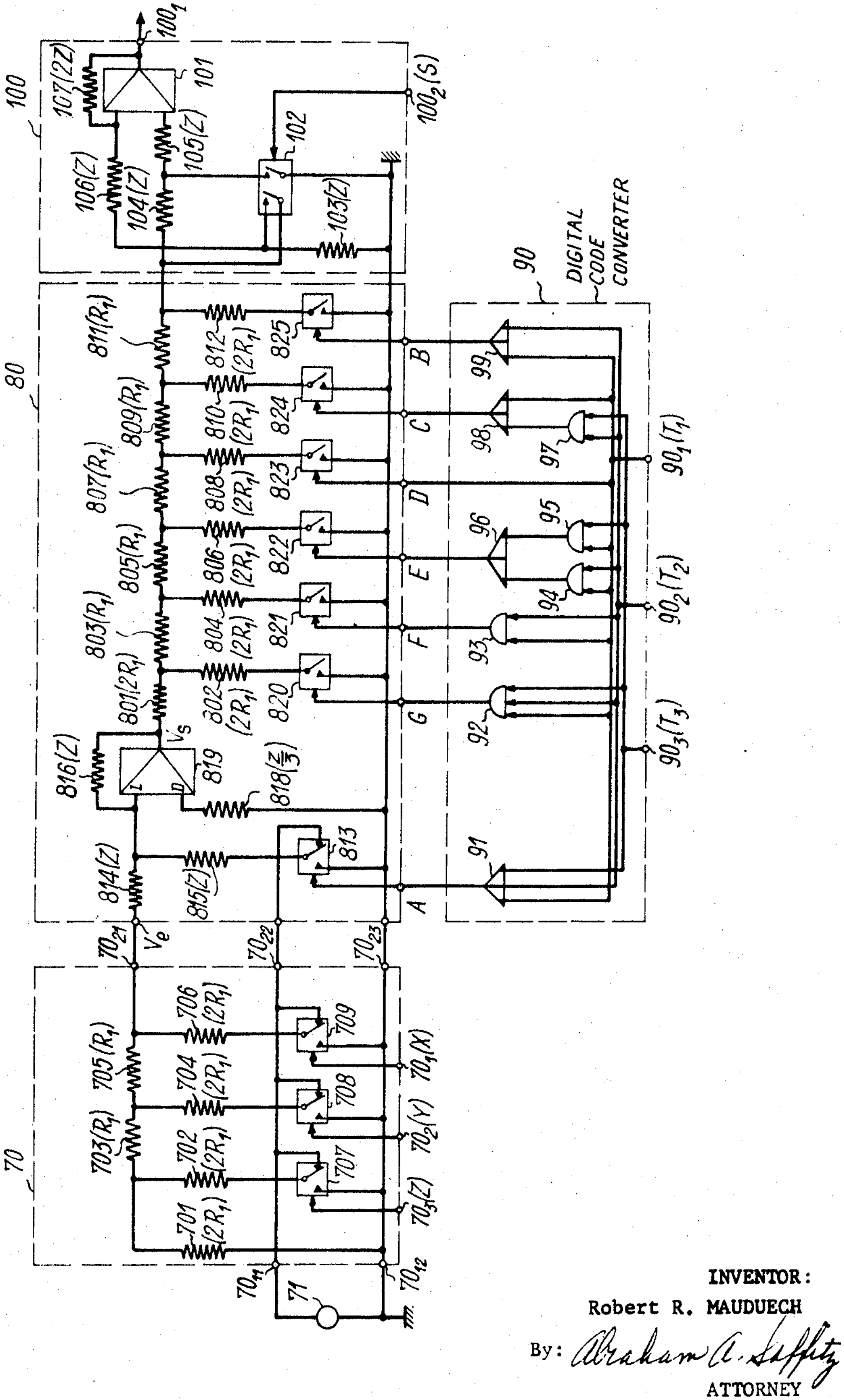
FIG. 4 illustrates an expansion decoder according to the invention.

FIG. 4 illustrates the diagram of an expansion decoder according to the invention. Its function is to reconstitute, from the one sign bit and six code bits it receives, a direct voltage of appropriate polarity whose value is proportional to the binary number represented by the aforesaid six code bits.

In FIG. 4, 70 is a ladder network comprising two series arms 703, 705 having the resistance $R_1$, three shunt arms 702, 704, 706 having the resistance 2 $R_1$, and a load resistance 701 having the value 2 $R_1$. The shunt arms 702, 704, 706 are equipped, respectively, with switches 707, 708, 709. These switches are controlled, respectively, by the bits *Z*, *Y*, *X* applied to terminals $70_3$, $70_2$, $70_1$. When in the idle state ($Z = 0$, $Y = 0$, $X = 0$) they connect the shunt as 702, 704, 706 to ground and a zero voltage prevails between terminals $70_{21}$ – $70_{23}$. A voltage having a value proportional to the value of the combination *X Y Z* appears between these same terminals as soon as the switches connect one or more of the shunt arms 702, 704, 706 to the terminal $71_{11}$ of a source 71 of direct current, whose other terminal $71_{12}$ is grounded. The internal resistance of this source is negligible compared to those of the resistances (2 $R_1$).

Circuit 80 comprises an attenuator network preceded by an amplifier whose input terminals are connected to the output terminals $70_{21}$, $70_{23}$ of the assembly 70. The said circuit 80 may be considered as a variable gain amplifier.

The ladder network is of identical structure to that of the assembly 30 of the coder of FIG. 1. It comprises a series arm 801 with the resistance 2 $R_1$, five series arms 803, 805, 807, 809, 811 having the resistance $R_1$, six shunt arms 802, 804, 806, 808, 810, 812 having the resistance 2 $R_1$; each of these latter arms is equipped with switches 820 to 825 (transistors in blocked-saturated operation) controlled respectively by the signals *G*, *F*, *E*, *D*, *C*, *B* reconstituted from the binary elements $T_1$, $T_2$, $T_3$ by means of the assembly of logical circuits 90. This assembly 90 establishes the Boolean relationships (6) cited in the foregoing.

When the signals *G*, *F*, *E*, *D*, *C*, *B* are equal to zero, all the shunt arms of the ladder network come into play and the said network has a maximum attenuation. For example, if $B = 1$, the switch 825 deactivates the arm 812 and the attenuation of the network decreases by six decibels. In conclusion, the operation of the attenuator network of the assembly 80 is reciprocal to that of the attenuator network of the assembly 30.

The variable gain amplifier 80 is supplied, from the terminals $70_{21}$, $70_{23}$ of the assembly 70, through a voltage divider 814, 815. The switch 813, of the same type as that of FIG. 2, activates the arm 815 when it is actuated by the signal $A = 1$ reconstituted by application of the signals $T_1$, $T_2$, $T_3$ to the input terminals of an OR gate 91.

The device 100 situated at the output of the attenuator network and controlled by the sign bit S, reverses the voltage provided by the line when S = 1. Its amplification factor may be equal to plus or minus two as in the device of FIG. 3.

Figure 5:
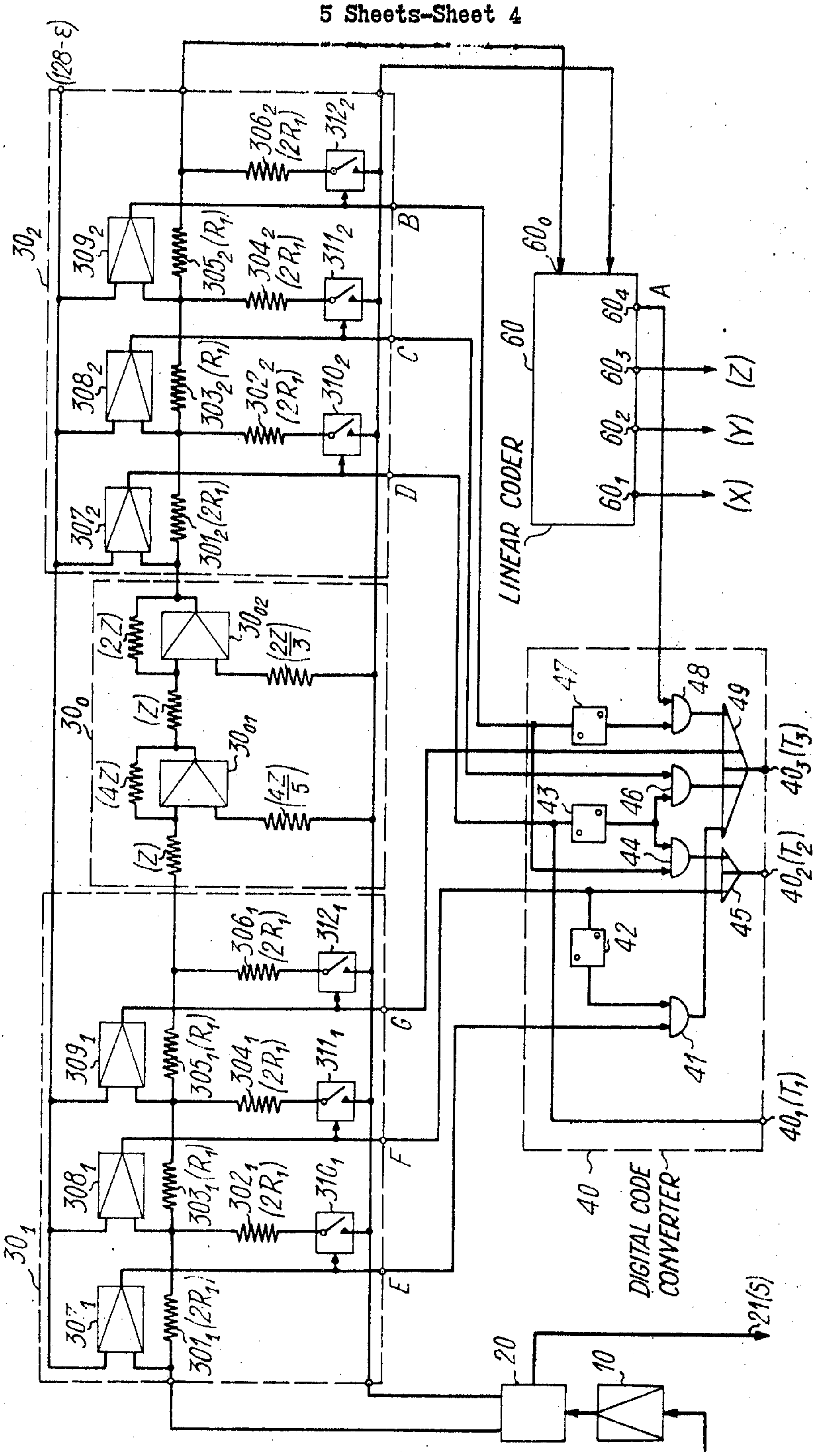
FIG. 5 illustrates a modified form of the compression coder of the invention.
Figure 6:
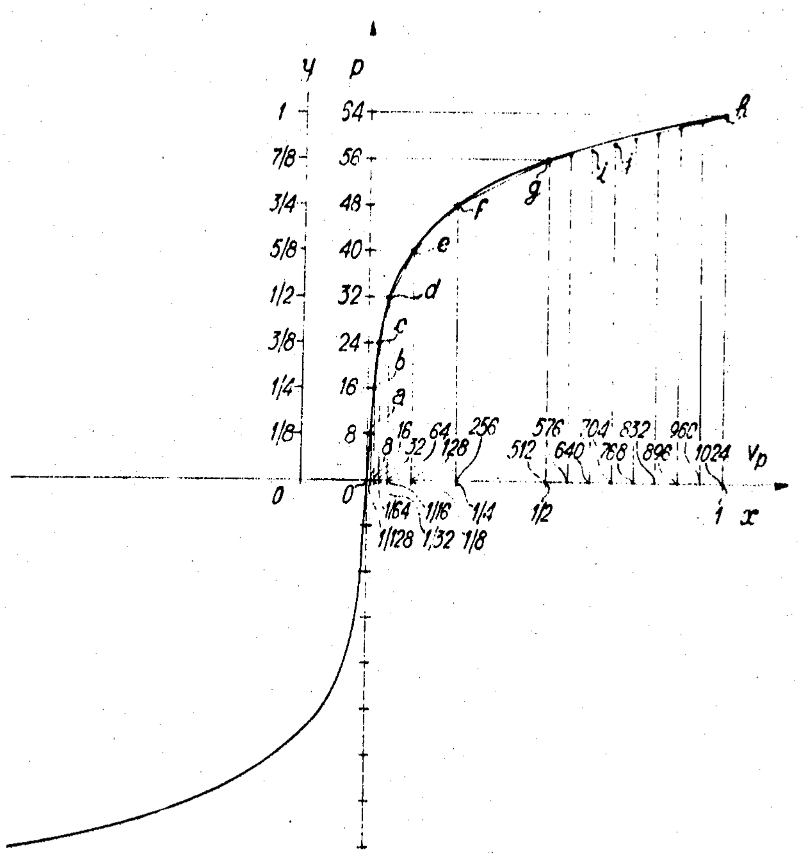
FIG. 6 represents a compression curve, useful for explaining the principles of the invention as disclosed in the introductory part.

FIG. 5 illustrates a modified form of the compression encoder of the invention. In this coder, the reference voltages are less numerous than in that of FIG. 1; this is advantageous since the diversity of the reference sources, by multiplying the number of switches increases the probability of errors, unless these switches are built with great care. When the values of the quantizing steps are of the order of a few millivolts, the said errors are comparable to the actual samples to be coded.

In FIG. 5, the elements in common with those of the encoder of FIG. 1 bear the same reference numerals. The feature of the encoder of FIG. 5 is that the attenuator network, sequentially dividing the voltages, has been split into two identical parts $30_1$, $30_2$ separated by an amplifier assembly $30_0$. The part $30_1$ supplies the signals *E*, *F*, *G*. The part $30_2$ supplies the signals *B*, *C*, *D*.

The comparators of the two parts $30_1$, $30_2$ have their first input terminals connected to one and the same reference source whose voltage is equal to $(128 - \epsilon)$ steps.

The amplifying system $30_0$ effects a double reversal of the voltage issuing from the circuit $30_1$ and amplifies the same eight times before being attenuated by the circuit $30_2$.

The signal which issues from the circuit $30_2$ is applied to the four-stage linear coder 60 which may be of any known type. The first stage of the coder delivers the signal A at $60_4$. The three other stages of the coder 60 deliver the binary elements *X*, *Y*, *Z*, respectively at $60_1$, $60_2$, $60_3$.

What I claim is:

1. Compression coder for coding original samples of analog signals into PCM signals in which the amplitudes of the original samples to be coded are distributed into amplitude ranges forming the widths of quantizing steps which exponentially increase with amplitude and the amplitudes of the corresponding compressed samples being distributed into successive equal amplitude ranges forming the heights of said quantizing steps and defined by binary digit combination signals expressed in a PCM code, comprising a network of identical cascaded attenuators, each of said attenuators having a first state in which its attenuation is zero and a second state in which its attenuation is two, means for applying to the input of said network samples of said analog signals, a plurality of comparators respectively comparing to a predetermined voltage the signals at the outputs of the attenuators, a plurality of switching means respectively controlled by said comparators and selectively controlling the states of the attenuators, whereby the output signals of the comparators form binary digit combination signals representative of said samples expressed in a special code comprising a set of successive one digits and an adjacent set of successive zero digits in which the number of one digits is equal to the decimal number of the quantizing step and the number of zero digits is equal to the complement of said decimal number to the total number of said quantizing steps, the digits of the special code combination representative of an original sample being correlated to the digits of the PCM code combination representative of the corresponding compressed sample by linear relationships, and a computer deriving the digits of the PCM code combination representative of the compressed sample from the digits of the special code combination representative of the corresponding original sample.

* * * * *